Oct. 29, 1963 P. D. HENDERSON 3,108,475
GYROSCOPIC MASS FLOWMETER
Filed Feb. 13, 1961 4 Sheets-Sheet 1
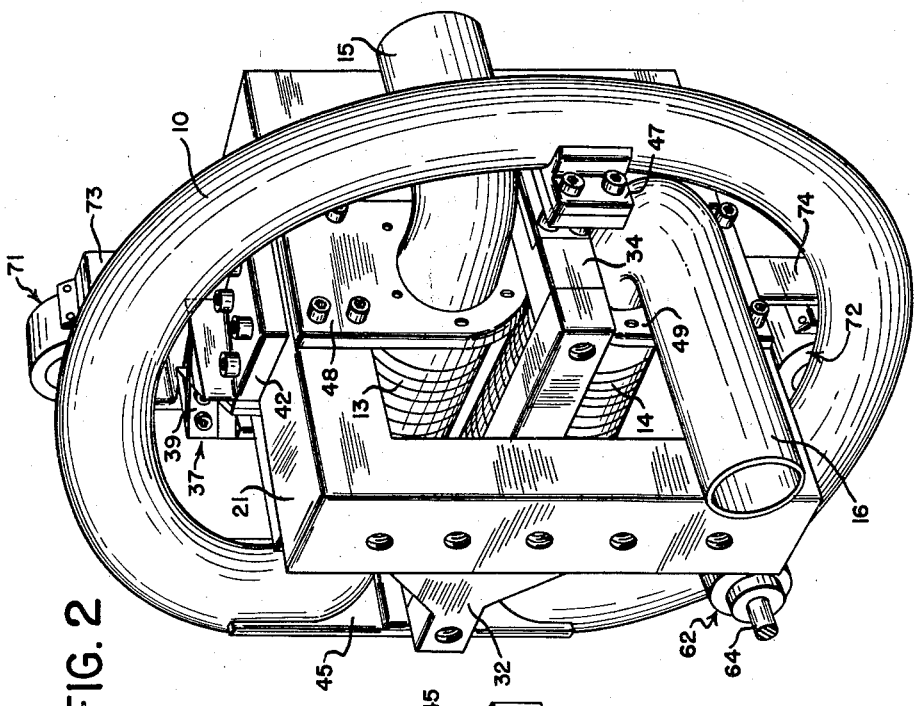
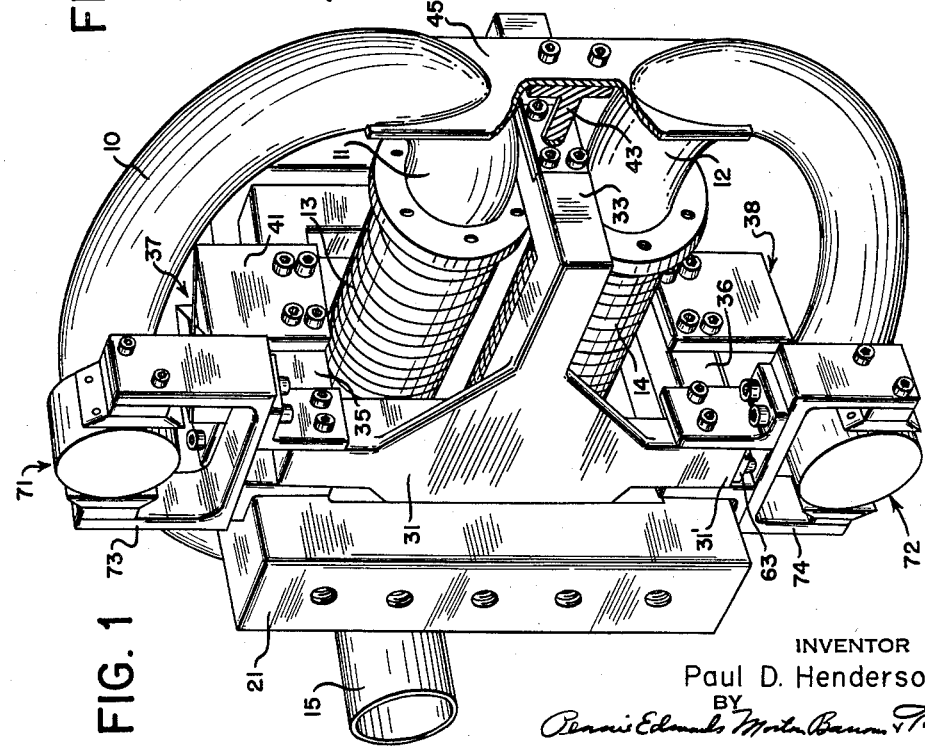
INVENTOR
Paul D. Henderson
BY
ATTORNEYS Oct. 29, 1963  P. D. HENDERSON  3,108,475
GYROSCOPIC MASS FLOWMETER
Filed Feb. 13, 1961  4 Sheets-Sheet 2
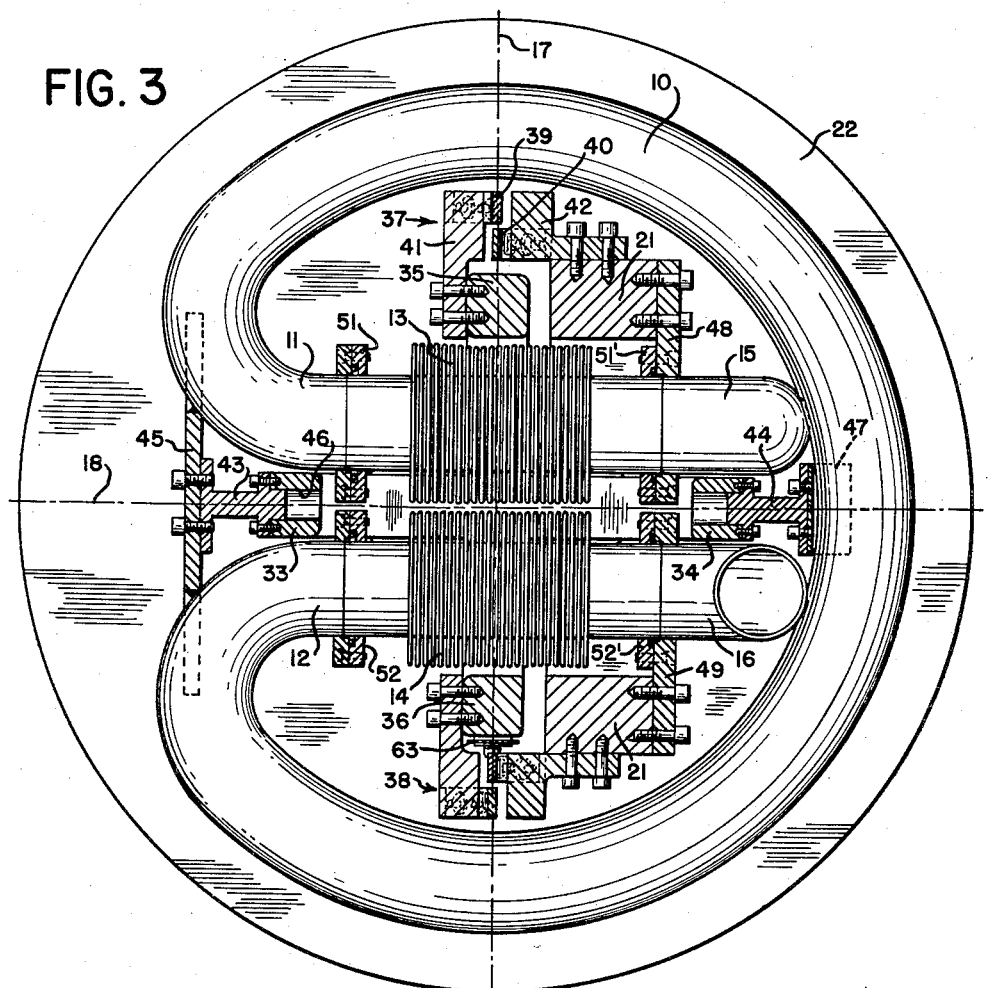
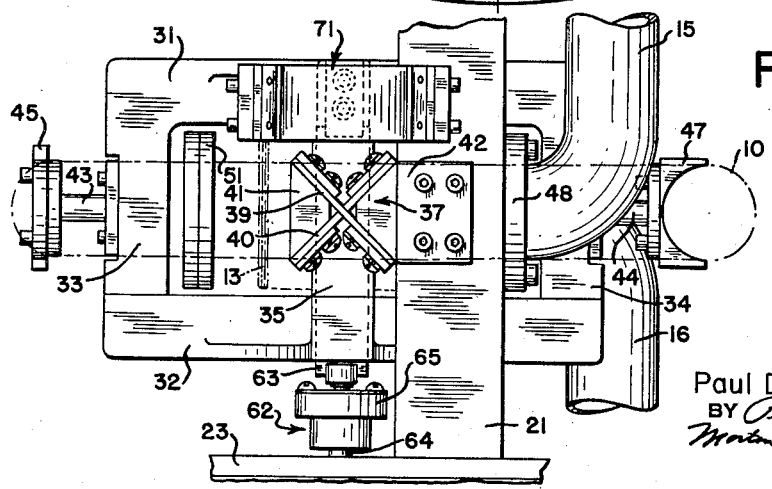
INVENTOR
Paul D. Henderson
BY
ATTORNEYS INVENTOR
Paul D. Henderson
ATTORNEYS Oct. 29, 1963  P. D. HENDERSON  3,108,475
GYROSCOPIC MASS FLOWMETER
Filed Feb. 13, 1961  4 Sheets-Sheet 4
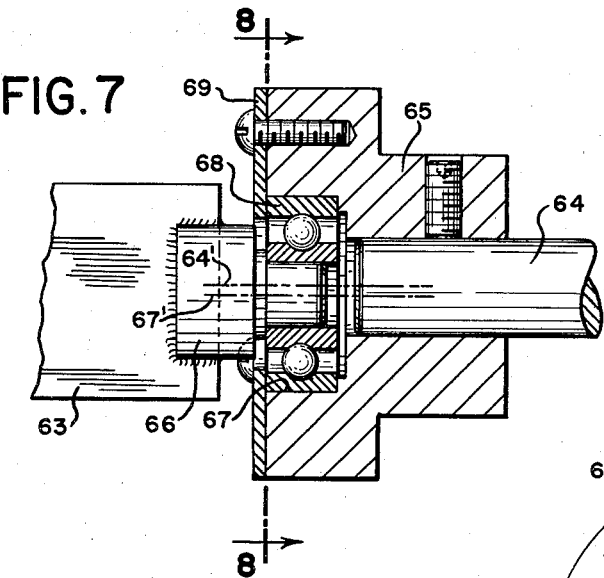
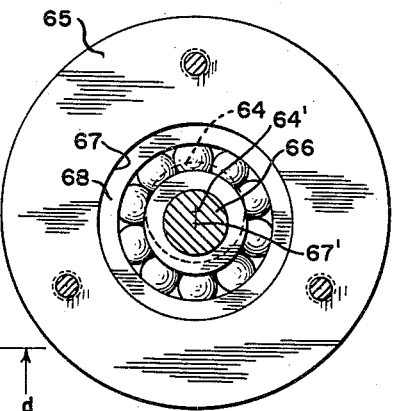
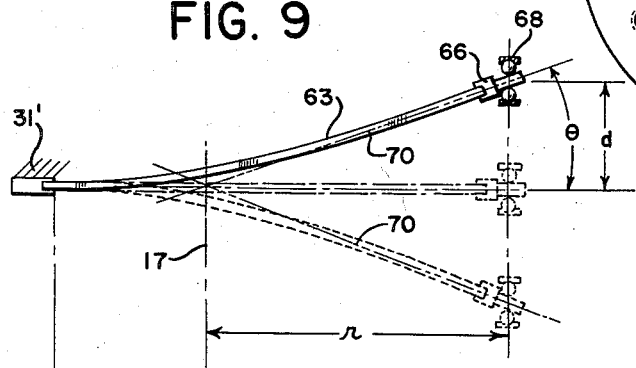
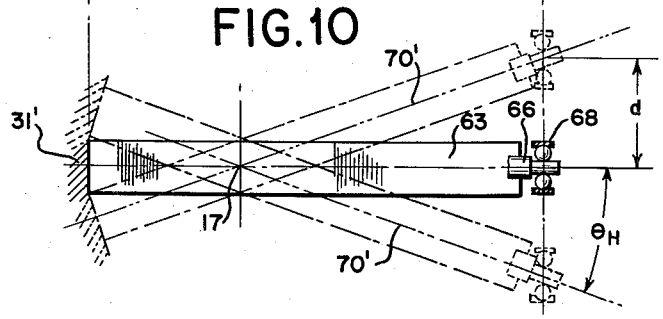
INVENTOR
Paul D. Henderson
BY
ATTORNEYS

United States Patent Office 3,108,475
Patented Oct. 29, 1963

3,108,475
GYROSCOPIC MASS FLOWMETER
Paul D. Henderson, Avon, Conn., assignor to
Wilfred Roth, West Hartford, Conn.
Filed Feb. 13, 1961, Ser. No. 88,806
7 Claims. (Cl. 73—194)

This invention relates to gyroscopic mass flowmeters of the oscillating or A.-C. type, and particularly to a drive mechanism therefor.

In a gyroscopic mass flowmeter of the A.-C. type, a fluid conduit loop is mounted for oscillation about drive and torque axes. These axes are advantageously perpendicular to each other. Inlet and outlet conduit sections are provided to lead fluid to and from the loop. By oscillating the loop about the drive axis, a torque is produced about the torque axis due to gyroscopic couples when fluid flows in the loop. These gyroscopic couples, and hence the torque, vary with the mass flow of the fluid. Indicating means are provided which respond to movement of the loop about the torque axis. The indicating means may include one or more transducers arranged to respond to the amplitude, velocity, acceleration, etc. of the loop oscillation.

In U.S. Patent 2,865,201, issued December 23, 1958, to Roth for "Gyroscopic Mass Flowmeter," flowmeters of the oscillating or A.-C. type are described, and the principles of operation explained in considerable detail. As explained therein, the output varies with the amplitude of oscillation about the drive axis. Therefore it is important to maintain this amplitude of oscillation constant, in order to obtain an accurate indication of mass flow.

Only small amplitudes of oscillation are commonly required, angles of the order of a degree or less being found satisfactory for many applications. Thus any play, backlash, looseness, etc. in the drive mechanism, even though very small, may introduce serious errors in measurement. Further, the frequency of oscillation, say 600 r.p.m., and the need for continuous duty under possibly adverse operating conditions, necessitate a drive mechanism capable of operating for long periods of time without substantial wear.

The present invention is directed to a simple drive mechanism which has been found to meet the foregoing requirements very satisfactorily.

In accordance with the invention, a flat spring is attached at one end to the oscillating frame which mounts the loop for oscillation about the drive axis, and the other end is driven in a circular path by an eccentric bearing coupling mounted on a drive shaft rotated by a suitable motor. The width of the spring is substantially perpendicular to the drive axis, so that it strongly resists bending in the direction producing the oscillation. However, it is free to bend in a direction generally parallel to the drive axis to accommodate the circular motion of its outer end.

Advantageously the point of attachment to the oscillating frame is on the opposite side of the drive axis from the eccentric bearing coupling, and the distance predetermined so that little or no axial movement of the parts of the bearing is required during the rotation thereof. This insures an accurate amplitude of oscillation without undue wear in the bearing. Further, the spring and its mounting, and the mounting of the oscillating frame, are advantageously arranged to provide biasing forces on the eccentric bearing in a direction generally parallel to the drive axis and in a direction perpendicular thereto. Thus adverse effects due to play or backlash in the bearing are eliminated.

The invention will be further described in connection with a specific embodiment thereof, taken in conjunction with the drawings in which:

FIGS. 1 and 2 are perspective drawings from opposite sides of the gyroscopic mass flowmeter, with the end plates and cover removed;

FIG. 3 is a vertical cross-section in the plane of the loop, taken along the line 3—3 of FIG. 5;

FIG. 4 is a detail showing the crossed flexor mounting arrangement for movement about the drive axis;

FIG. 7 is a cross-section of the eccentric bearing coupling at the outer end of the flat spring;

FIG. 8 is a face view of the bearing coupling with the cover plate removed, as indicated by line 8—8 of FIG. 7; and FIGS. 9 and 10 are diagrams illustrating the mounting and operation of the flat spring.

Figure 5:
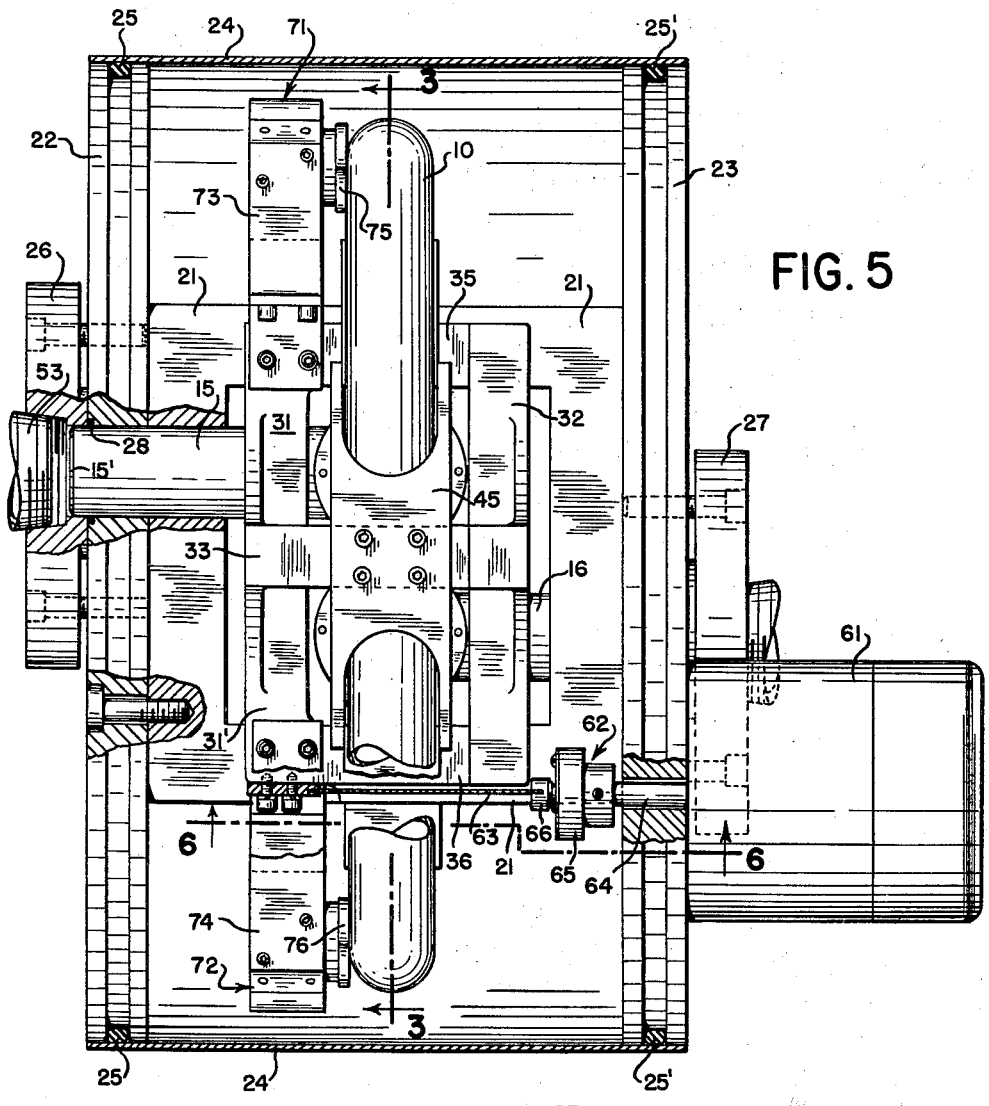
FIG. 5 is an elevation taken from the left side of FIG. 3, with certain portions broken away to show the internal structure.
Figure 6:
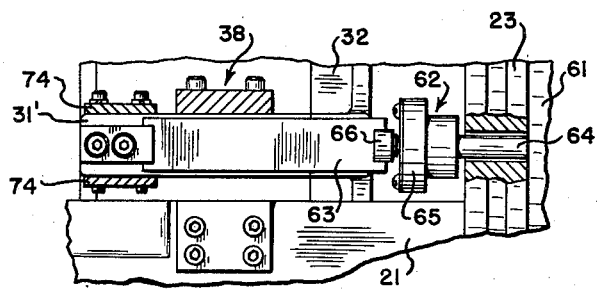
FIG. 6 is a cross-section along the line 6—6 of FIG. 5, showing the drive mechanism.

Referring to the drawings, a fluid conduit loop 10 is shown in the form of a pipe bent into a circular loop. If desired, the pipe may be bent to form a rectangular or other shaped loop. The ends 11 and 12 of the loop conduit are bent inwards of the loop in the plane thereof, and are attached to respective flexible tubular conduit sections, here shown as bellows 13, 14. Inlet and outlet fluid conduit sections 15, 16 are provided, and here take the form of right-angle pipe elbows. The inner ends of the elbows are attached to bellows 13, 14, respectively. The outer ends extend in opposite directions from the plane of the loop, thereby facilitating connecting the flowmeter in a pipe line. As will be understood, either of sections 15, 16 may serve as the inlet conduit and the other as the outlet conduit. For convenience section 15 will here be considered to be the inlet.

The loop 10 is mounted for oscillation about drive and torque axes 17, 18, respectively (FIG. 3). In the embodiment specifically shown, the drive axis is vertical and the torque axis horizontal. The mounting means for oscillation about the drive axis will be described first.

A support frame is provided comprising an open rectangular member 21 to which end plates 22 and 23 (FIG. 5) are bolted. A cylindrical cover 24 encircles end plates 22 and 23, and is sealed in place by sealing rings 25, 25'. Flanges 26 and 27 (FIG. 5) are bolted to end plates 22 and 23 so that external pipes may be connected thereto. This embodiment is designed to be supported by the external pipes, and consequently no base is shown. However, a base may be provided for mounting the flowmeter independently of the external connections.

The rectangular frame member 21 extends through the loop and may conveniently be made in two pieces (not shown) to facilitate assembly. An oscillating frame is mounted on the frame member 21 for oscillation about a drive axis with respect thereto. The oscillating frame comprises end members 31 and 32, joined together by transverse legs 33, 34, 35 and 36 to form a rigid structure.

The oscillating frame is mounted for oscillation about the stationary support frame by means of a pair of crossed flexor mountings 37 and 38. The upper flexor mounting 37 includes two flexing members 39 and 40 which are substantially perpendicular to each other and vertically separated. Opposite ends of flexing members 39, 40 are attached to brackets 41, 42, which in turn are bolted respectively to transverse leg 35 of the oscillating frame and to frame member 21 of the stationary frame. The lower flexor mounting 38 is similar.

By using the crossed flexing members for mounting the oscillating frame on the support frame, any play or looseness in the coupling is avoided. Inasmuch as the amplitude of oscillation is very small, only slight flexing of members 39 and 40 is required, and they may be made quite stiff so as to provide a strong support while at the same time allowing rotation through small angles.

The loop 10 is mounted on the oscillating frame for oscillation about a torque axis with respect thereto. Torsion rods 43 and 44 are employed for the purpose. A flange in the outer end of torsion rod 43 is bolted to a plate 45 which is welded or otherwise attached to the loop 10. A flange on the inner end is bolted to transverse leg 33 of the oscillating frame. As shown in FIG. 3, a hole 46 is drilled in leg 33 so that the end of the torsion rod can be precisely located therein. A flange on the outer end of torsion rod 44 is bolted to a plate 47 which in turn is welded or otherwise attached to loop 10. A flange on the inner end is bolted to transverse leg 34 of the oscillating frame.

By the use of torsion rods for supporting the loop, the torque axis is precisely defined and the torsion rods provide a restoring force urging the loop to a neutral position, which is here a vertical plane.

The inner ends of inlet and outlet conduit sections 15 and 16 are provided with flange plates 48 and 49 which are bolted to the stationary frame member 21. The bellows 13 and 14 are provided with flanges 51, 51' and 52, 52', respectively. Flanges 51, 52 are attached to cooperating flanges on the ends 11 and 12 of loop 10, as by bolting. Flanges 51', 52' are attached to flange plates 48 and 49 of the inlet and outlet conduits, as by bolting.

As seen in FIG. 5, the outer end of inlet conduit section 15 passes through a bore in end plate 22. The bore diameter is selected to provide a snug fit with conduit section 15, but to allow a slight longitudinal movement thereof if required due to temperature changes. Sealing ring 28 fits in a groove in end plate 22, and is compressed therein by flange 26 so as to provide a fluid-tight connection while allowing the longitudinal movement of 15.

Flange 26 is bolted to end plate 22 and is provided with a tapered pipe thread for connection with an external pipe 53. The tapered thread is made so that the end 15' of inlet section 15 will not abut the end of the external pipe 53 when the latter is threaded in place. Thus movement of the end of pipe 15 as a result of temperature changes is not prevented by contact with the external pipe.

Flange 27 for outlet conduit section 16 is similar to flange 26 and is bolted to end plate 23.

The oscillating frame is driven about the drive axis by a motor 61, an eccentric coupling 62 and a flat spring 63. The motor 61 is mounted on end plate 23 and the shaft 64 extends therethrough. The eccentric coupling 62 includes a fitting 65 attached to motor shaft 64, and a ball bearing eccentrically mounted therein. The outer end of spring 63 is attached to a fitting 66 which is inserted in the inner race of the ball bearing. Thus, as the motor rotates the eccentric coupling 62, the outer end of spring 63 moves circularly about the axis of motor shaft 64.

The inner end of spring 63 is attached to the lower end 31' of end member 31 of the oscillating frame. The width of the spring is perpendicular to the drive axis. Thus, as the outer end of the spring moves circularly, the oscillating frame is oscillated about the drive axis since the spring cannot bend in that direction. However, the spring can flex vertically to accommodate the circular motion. The point of attachment of the spring to the oscillating frame is on the other side of the drive axis with respect to the eccentric coupling 62, so that the inner race of the bearing is not forced to move in the axial direction with respect to motor shaft 64.

As shown in FIGS. 7 and 8, fitting 65 is affixed to shaft 64 by a set screw. The axis of shaft 64 is shown by the dot-dash line 64'. At the other end is a cylindrical bore 67 whose axis 67' is parallel to 64' but displaced therefrom by a distance corresponding to the desired amplitude of oscillation of the loop. The outer race of ball bearing 68 is press-fitted into bore 67. The fitting 66 attached to the outer end of spring 63 is press-fitted into the inner race of bearing 68. A cover 69 is secured over the end of fitting 65.

FIG. 9 shows the flexing of the spring in the vertical direction, generally parallel to the drive axis. FIG. 10 shows the movement about the drive axis 17. In both figures the angular movement has been grossly exaggerated for clarity. In one particular embodiment in which the spring 63 is 4" long, the movement of the outer end is 0.030" from the center position.

The upper position in FIG. 9 corresponds to the center position in FIG. 10, and both are shown in full lines. The lower dotted position in FIG. 9 also corresponds to the full-line center position in FIG. 10. The central position in FIG. 9 corresponds to the extreme angular positions in FIG. 10, and they are shown by dot-dash lines. The point of attachment of the spring to the lower end 31' of end plate 31 of the oscillating frame is indicated. Since the point of attachment must remain in a horizontal plane due to the flexor mountings, the position does not change as viewed in FIG. 9. However, the point of attachment moves in the arc of a circle about the drive axis, as indicated by the three positions in FIG. 10.

The point of intersection of the spring 63 with the drive axis, as projected on the horizontal plane, cannot move since the drive axis is fixed. Accordingly the spring moves through an angle $\theta_H$ as it travels from its central position to either extreme, as seen in FIG. 10. It is highly desirable to have the orbit of the bearing 68 lie in a plane at right angles to the drive shaft axis 64' (FIG. 7) so that axial movement between the races of the bearing is avoided, or forces tending to produce such movement. This requires that the effective point of attachment of the outer end of the spring to the bearing describe a cone whose axis is perpendicular to the drive axis and whose apex is at the drive axis. This cone is indicated by the dot-dash lines 70, 70' in FIGS. 9 and 10. It will be noted that lines 70 in FIG. 9 are tangent to the spring.

This can be accomplished by positioning the drive shaft 64 perpendicular to and intersecting the drive axis 17, and properly selecting the distance between the drive axis and the point of attachment of the spring to the oscillating frame. For small eccentricities as compared to spring length, such as mentioned above, it has been found satisfactory to employ the equations for a cantilevered beam to determine the distance between the drive axis and the point of attachment to the oscillating frame. The equation for the end angle $\theta$ (FIG. 9) is:

$$\theta = \frac{Wl^2}{2EI} \quad (1)$$

where $W$ = applied load
$l$ = length of beam
$E$ = modulus of elasticity
$I$ = section moment of inertia.

The equation for the deflection $d$ of the end of the beam is:

$$d = \frac{Wl^3}{3EI} \quad (2)$$

This can be rewritten as:

$$W = \frac{3EId}{l^3} \quad (3)$$

Substituting Equation 3 in (1) and solving for $l$:

$$l = \frac{3d}{2\theta} \quad (4)$$

From FIG. 10 it is seen that the deflection $d$ is equal to $r \times \theta_h$, and from FIGS. 9 and 10 it is seen that $\theta$ equals $\theta_h$. Substituting these relations in Equation 4:

$$l = \frac{3r}{2} \quad (5)$$

Thus the total length of the spring is one and one-half times the distance from the orbit plane of the bearing to the drive axis and, since the eccentricity of the bearing is small, the distance from the drive axis to the point of attachment to the oscillating frame is substantially one-third the length of the spring.

With the distance thus determined, it has been found that wear of the bearing is substantially reduced, and operation over long periods of time substantially improved. Even though the relationship may be departed from in a given application, it is advantageous to attach the spring to the oscillating frame on the opposite side of the drive axis from the eccentric coupling, and at a substantial distance therefrom.

The above equations assume that the spring extends to the effective point of attachment to the bearing. However, as shown in previous figures, a short fitting 66 is employed so that this assumption does not apply rigorously. If necessary this can be taken into account in determining the actual distances.

In FIGS. 9 and 10 the inner race of the bearing appears to be at a substantial angle with respect to the outer race, due to the exaggerated eccentricity. With an eccentricity of 0.030″, as has been successfully employed, the angle is very small and normal tolerances permit mounting the bearing with its axis parallel to the motor shaft. However, if desired, it may be tilted slightly inwards to approximate the angle of lines 70, 70′.

Since there may be a slight play even in high quality bearings, the bearing 68 is advantageously pre-stressed so that the effects of backlash are eliminated. This may be accomplished by arranging the spring and its attachment to the oscillating frame to provide a biasing force on the bearing in a direction generally parallel to the drive axis. With an initially flat spring, the mounting plane at 31′ may be tilted slightly upwards or downwards, or a shim may be employed. Or, the spring may be formed with an initial curvature. Pre-stressing in the direction perpendicular to the drive axis may be accomplished by providing biasing means urging the oscillating frame in one direction about the drive axis against the restraint provided by the flat spring, thereby producing a biasing force on the bearing. To this end, the flexor couplings 37, 38 may be shimmed, or their mounting arranged at a slight angle about the drive axis with respect to the rest position established by the spring.

It will be understood that the flat spring need not necessarily have a rectangular cross-section, so long as it bends relatively easily in one direction but not substantially in the other. For example, the cross-section might be a shallow ellipse.

For best results, high quality bearings should be employed for mounting the drive shaft 64 in motor 61. If it is desired to use a motor not having sufficiently good bearings, drive shaft 64 may be a jack shaft mounted in suitable bearings, and the jack shaft driven by the motor.

Completing the description of the drawings, the oscillation of loop 10 about the drive axis produces oscillation of the loop about the torque axis varying with fluid flow in the loop. Transducers 71 and 72 are provided for sensing the oscillation about the torque axis. The housings of the transducers are mounted in brackets 73 and 74 attached to the end plate 31 of the oscillating frame. The cooperating movable members of the transducers (75, 76 in FIG. 5) are attached to the loop 10 so that movement of the loop is sensed by the transducers. They may be of the moving coil type described in Patent 2,865,201, supra, and may be connected in series-aiding with the outputs supplied to suitable instrumentation for indicating mass flow. The details of the transducers form no part of the present invention and hence they need not be described further.

Certain features of the mass flowmeter specifically described are shown and claimed in copending application Serial No. 88,805, filed concurrently herewith by Wilfred Roth for "Gyroscopic Mass Flowmeter."

The invention has been described in connection with a specific embodiment thereof. It will be understood that modifications may be made by those skilled in the art within the spirit and scope of the invention.

I claim:

1. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a flat spring member attached at one end thereof to said frame and extending laterally of said drive axis, the width of said spring member being substantially perpendicular to said drive axis, and means for moving the other end of said spring member in a substantially circular path to oscillate said frame about said drive axis.

2. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a drive shaft extending substantially perpendicular to said drive axis and spaced therefrom, means for rotating said drive shaft, a bearing eccentrically mounted on said drive shaft, and a flat spring attached at one end to said frame and at the other end to said bearing, the width of said spring being substantially perpendicular to said drive axis.

3. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a drive shaft extending substantially perpendicular to said drive axis and spaced therefrom, means for rotating said drive shaft, a bearing eccentrically mounted on said drive shaft, and a flat spring rigidly attached at one end to said frame at a point lying in a plane through the drive shaft axis and perpendicular to said drive axis, the other end of said spring being attached to said bearing and the width of said spring being substantially perpendicular to said drive axis.

4. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a drive shaft extending substantially perpendicular to said drive axis and spaced therefrom, the axis of said drive shaft intersecting said drive axis, means for rotating said drive shaft, a bearing eccentrically mounted on said drive shaft, a flat spring rigidly attached at one end to said frame at a point on the opposite side of said drive axis from said drive shaft with the width of the spring substantially perpendicular to the drive axis, said point of attachment lying in a plane through the drive shaft axis and perpendicular to said drive axis, the other end of said spring being attached to said bearing.

5. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a drive shaft extending substantially perpendicular to said drive axis and spaced therefrom, the axis of said drive shaft intersecting said drive axis at a predetermined point, means for rotating said drive shaft, a bearing eccentrically mounted on said drive shaft, a flat spring rigidly attached at one end to said frame at a point on the opposite side of said drive axis from said drive shaft with the width of the spring substantially perpendicular to the drive axis, said point of attachment lying in a plane through the drive shaft axis and perpendicular to said drive axis, the other end of said spring being attached to said bearing, whereby said spring flexes in a direction generally parallel to said drive axis but not in a direction perpendicular to the drive axis as said drive shaft rotates to oscillate said frame, the distance between said drive axis and said point of attachment to the frame being predetermined so that the distance from the bearing to said point of intersection of drive shaft and drive axes is substantially constant throughout the rotation of the bearing.

6. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a drive shaft extending substantially perpendicular to said drive axis and spaced therefrom, the axis of said drive shaft intersecting said drive axis at a predetermined point, means for rotating said drive shaft, a ball bearing having concentric inner and outer races, one of said races being eccentrically mounted on said drive shaft, a flat spring rigidly attached at one end to said frame at a point on the opposite side of said drive axis from said drive shaft with the width of the spring substantially perpendicular to the drive axis, said point of attachment lying in a plane through the drive shaft axis and perpendicular to said drive axis, the other end of said spring being attached to the other race of said bearing, whereby said spring flexes in a direction generally parallel to said drive axis but not in a direction perpendicular to the drive axis as said drive shaft rotates to oscillate said frame, the distance between said drive axis and said point of attachment being predetermined so that tangents to the spring at said bearing in the plane of said drive shaft and drive axes substantially intersect at said predetermined point of intersection of the axes.

7. In a gyroscopic mass flowmeter having support means, a frame mounted on said support means for oscillation about a drive axis with respect thereto, and a fluid conduit loop mounted on said frame for oscillation about a torque axis with respect thereto, driving means which comprises a drive shaft extending substantially perpendicular to said drive axis and spaced therefrom, the axis of said drive shaft intersecting said drive axis at a predetermined point, means for rotating said drive shaft, a ball bearing having concentric inner and outer races, one of said races being eccentrically mounted on said drive shaft, a flat spring rigidly attached at one end to said frame at a point on the opposite side of said drive axis from said drive shaft with the width of the spring substantially perpendicular to the drive axis, said point of attachment lying in a plane through the drive shaft axis and perpendicular to said drive axis, the other end of said spring being attached to the other race of said bearing, whereby said spring flexes in a direction generally parallel to said drive axis but not in a direction perpendicular to the drive axis as said drive shaft rotates to oscillate said frame, the distance between said drive axis and said point of attachment being predetermined so that tangents to the spring at said bearing in the plane of said drive shaft and drive axes substantially intersect at said predetermined point of intersection of the axes, said spring and the attachment thereof to the frame being arranged to provide a biasing force on said bearing in a direction generally parallel to the drive axis, and biasing means urging said frame in one direction about the drive axis for producing a biasing force on said bearing in a direction perpendicular to the drive axis.

References Cited in the file of this patent

UNITED STATES PATENTS

| | | |
|---|---|---|
| 1,263,767 | Hoepner | Apr. 23, 1918 |
| 2,386,706 | Moessinger | Oct. 9, 1945 |
| 2,532,213 | Wilcox et al. | Nov. 28, 1950 |
| 2,699,502 | Hohl et al. | Jan. 11, 1955 |
| 2,865,201 | Roth | Dec. 23, 1958 |